(12) United States Patent
Grundy et al.

(10) Patent No.: US 7,347,697 B2
(45) Date of Patent: Mar. 25, 2008

(54) ACTIVE CONNECTOR

(75) Inventors: Kevin P. Grundy, Fremont, CA (US); Gary Yasumura, Santal Clara, CA (US)

(73) Assignee: Novias, Inc., Freemont, CA (US)

( * ) Notice: Subject to any disclaimer, the term of this patent is extended or adjusted under 35 U.S.C. 154(b) by 0 days.

(21) Appl. No.: 11/092,034

(22) Filed: Mar. 28, 2005

(65) Prior Publication Data
US 2005/0215089 A1    Sep. 29, 2005

Related U.S. Application Data

(60) Provisional application No. 60/557,128, filed on Mar. 26, 2004.

(51) Int. Cl.
*H01R 12/00* (2006.01)
(52) U.S. Cl. ........................................................ 439/61

(58) Field of Classification Search ................ 439/61; 385/16; 333/101, 104, 105; 235/92 T
See application file for complete search history.

(56) References Cited

U.S. PATENT DOCUMENTS

| | | | | | |
|---|---|---|---|---|---|
| 3,447,078 | A | * | 5/1969 | Levy | 324/72.5 |
| 4,249,070 | A | * | 2/1981 | Miller | 377/47 |
| 4,296,665 | A | * | 10/1981 | Howell | 84/655 |
| 4,893,086 | A | * | 1/1990 | Shrewsbury | 324/545 |
| 5,923,271 | A | * | 7/1999 | Santini | 341/20 |
| 6,265,953 | B1 | * | 7/2001 | Romano | 333/101 |
| 6,570,750 | B1 | * | 5/2003 | Calcatera et al. | 361/115 |
| 2006/0002654 | A1 | * | 1/2006 | James et al. | 385/16 |

* cited by examiner

*Primary Examiner*—J. E. Duverne
(74) *Attorney, Agent, or Firm*—Ronald R. Shea, Esq.

(57) ABSTRACT

Interconnection assemblies which adjust their alignment and performance through the use of control feedback from the data transferred through the assemblies.

33 Claims, 5 Drawing Sheets

ACTIVE CONNECTOR

CROSS-REFERENCE TO RELATED APPLICATIONS

This application claims priority from, and hereby incorporates by reference, U.S. Provisional Application No. 60/557,128, filed Mar. 26, 2004 and entitled "Active Connectors."

FIELD OF THE INVENTION

The present invention relates to the field of signal connection systems and the need for accurate and precise alignment of signal paths to ensure minimal signal loss and/or distortion.

BACKGROUND

Today's technique of building signal connection systems relies heavily upon methods and materials invented over forty years ago. Alignment pins, collars and pre-formed structures used in manufacturing define the tolerance of such connection systems.

For electrical signals, alignment of components comprising the signal path is required to achieve reliable conductivity. FIG. 1 illustrates a prior art system containing IC packages, through-hole connectors and printed circuit boards (PCBs) wherein the alignment of the components is fixed at manufacturing time.

For optical signals, alignment of the optical signal conductors (typically fiber optic strands) is also critical to proper signal levels being launched into the signal carrying fiber. Additionally, with multiple wavelength transmitters and receivers being used in single fibers, separate light sources must be carefully arranged and aligned within the transmitter/receiver assemblies. FIG. 2 illustrates a prior-art optical transceiver module wherein alignment is fixed once the module is assembled. In other optical modules micron level alignment of lasers and optical receivers is required during the manufacturing process. With such precision requirements, the cost of the equipment needed for manufacturing is high. On top of this, initial placement of components may shift over time (due to temperature, humidity, etc . . . ) thereby reducing the signal quality and strength.

With faster transistor switching speeds and with new, less disruptive signal path technologies, it is possible to transmit very high frequency signals over electrical signal paths. At higher frequencies, signal path stubs and varying impedances degrade the quality of the signal. The harmful effect of the stubs and variable impedance becomes more pronounced as the frequency increases.

FIG. 3 illustrates a prior art right angle connector wherein the alignment of the connector to the PCB is fixed at time of manufacture. In addition, the spatial relationship between the connector conductors is also fixed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Signals and signal paths may be optical, electrical or mixtures of optical and electrical. For electrical signal, controlled impedance signal paths may be microstrip, stripline, coax, or any other suitable structure. For optical signals, signal paths may be fibers, prisms or other suitable structures.

In the following descriptions references are made to actuators. Actuators include devices which, through external stimulus, provide for positional displacement in one or more directions. The stimulus to the actuators is not limited to any one type and may include electrical, pneumatic, mechanical, optical or hydraulic methods. Actuators be adjusted once or multiple times. Actuators may have single control inputs or multiple control inputs. Actuators may require constant power consumption to achieve their displacement or may only require power to be consumed while the actuator is in the process of displacement. The active element for actuator motion may consist of, but is not limited to: motors, linear motors, stepper motors, piezoelectric transducers, dielectric elastomer polymers, electrostatic deflection, electromagnetic deflection, thermal deforming materials or combinations thereof.

In the following descriptions references are made to connectors. Connectors may be, but are not limited to right-angle, straight, surface mount, through-hole, array, mezzanine and sockets. Connectors also include assemblies.

In embodiments disclosed herein, assemblies contain signal paths wherein the position of the signal paths and/or the transmission characteristic of the signal paths are controlled by actuating structures of various types. Also, in a number of embodiments, signal path positions are adjusted based on data generated from the quality of the signal traveling through the assembly, thus providing closed loop control of signal transmission characteristics. Adjustments in signal path transmission characteristics may include, but are not limited to, adjustments to signal path impedance, signal path alignment, signal path spacing, signal path engagement, signal path disengagement, signal stub lengths, capacitance, inductance, and/or dielectric constant.

Figure 1:
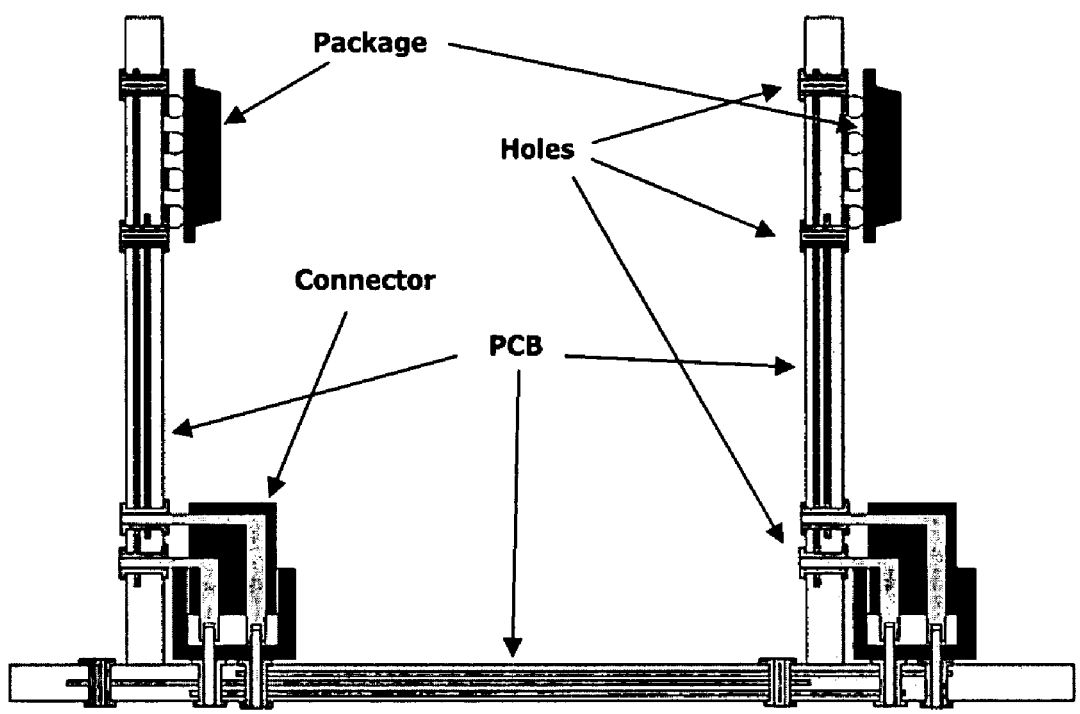
FIG. 1 illustrates prior art connection system wherein the signal paths are fixed at time of manufacture.
Figure 2:
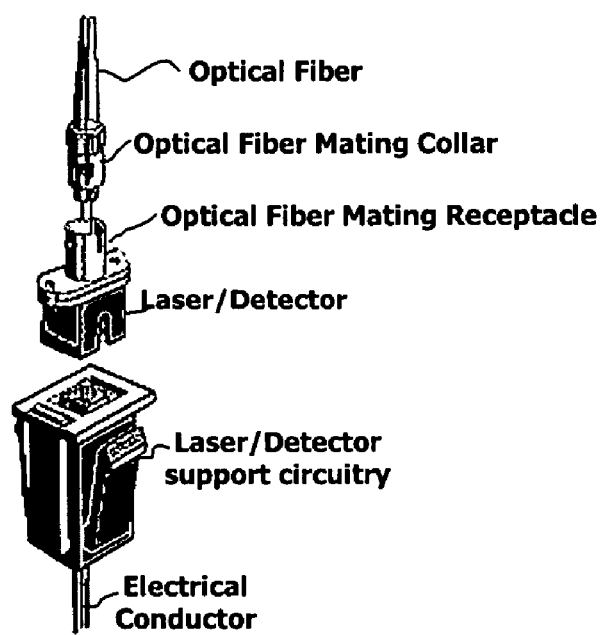
FIG. 2 illustrates a prior art optical transceiver with multiple transmitters and receivers with a fixed mechanical alignment mechanism.
Figure 3:
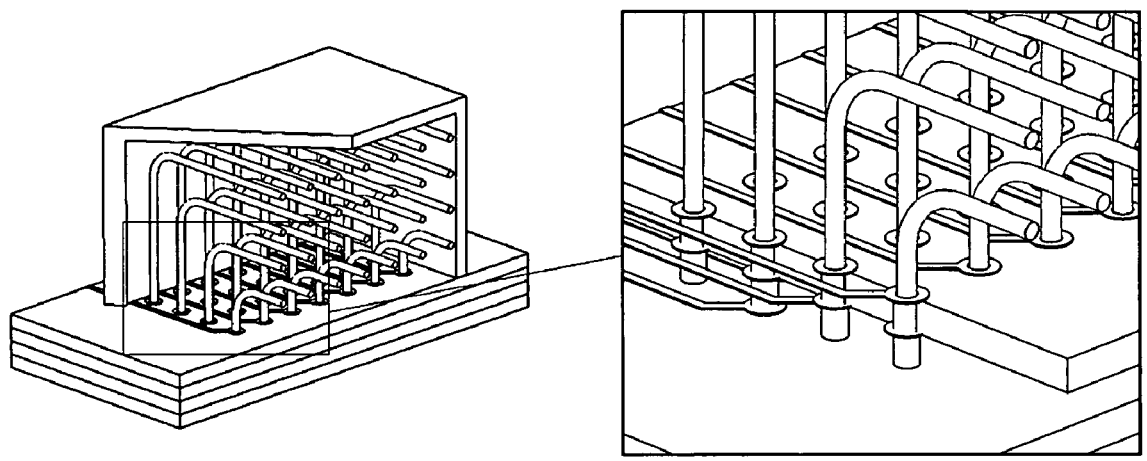
FIG. 3 illustrates a prior art through-hole connector with fixed alignment for mounting.
Figure 4:
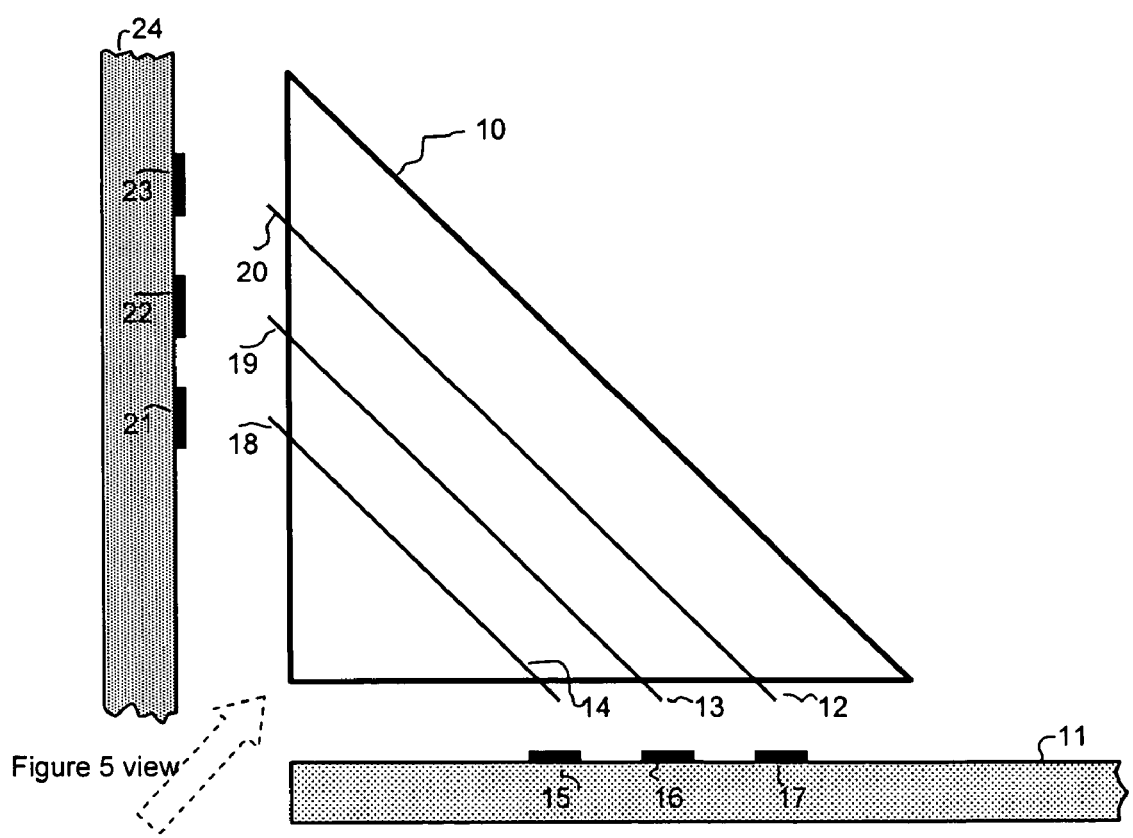
FIG. 4 illustrates a cross-section side view of a non-through-hole right-angle connector.
Figure 5:
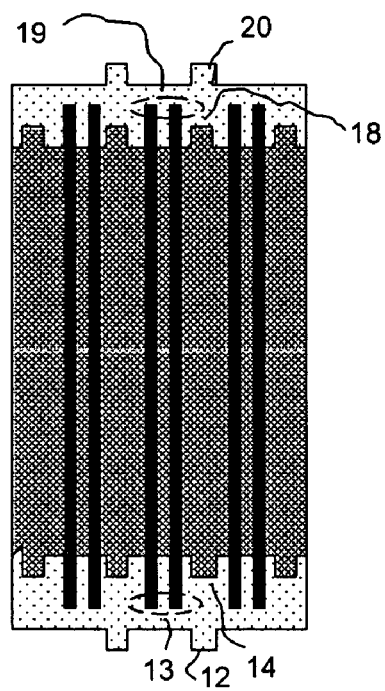
FIG. 5 illustrates a top view of the right-angle connector in FIG. 4.

FIG. 4 illustrates an embodiment of a right-angle differential signal connector 10 which does not require through-hole technology to achieve connection between two PCBs 11, 24. FIG. 5 illustrates a different view of signal connector 10. The traces on PCB 11 (15, 16, 17) are to connect to the traces on PCB 24 (21, 22, 23). The connector 10 employs electrical signal paths within its body 18, 19, 20 to make the connections. Signal path 20-12 in the connector 10 is utilized for ground and includes a conductive plane. Signal path 18-14 in the connector is used for ground and includes a conductive plane. Signal path 19-13 represents a strip-line transmission signal pair since the differential pair exists between two ground planes. FIG. 5 illustrates a bottom view of the signal layers within the connector 10. The impedance of the connector 10 is governed by the spacing of the differential pair traces 19-13 and the distance from each of the ground planes.

In one embodiment, the connector 10 is a differential connector intended to provide a constant differential impedance throughout its signal. For clarity in presenting this embodiment, an impedance of 100 Ohms is assumed although it may be a different value. Owing to manufacturing irregularities or positional tolerances, the signal traces 16 interfacing to the connector 10 from the PCB board 11 may have a differential impedance of 95 Ohms. Likewise, the impedance of the signal traces 22 on the PCB 24 may have a differential impedance of 105 Ohms. In this case, the entire signal path from PCB 11 to PCB 24 would have two impedance changes: from 95 Ohms to 100 Ohms as the signals entered from the PCB 11 and from 100 Ohms to 105 Ohms as the signal exited the connector 10 onto the other PCB 24. Impedance mismatches add to signal distortion.

Figure 6:
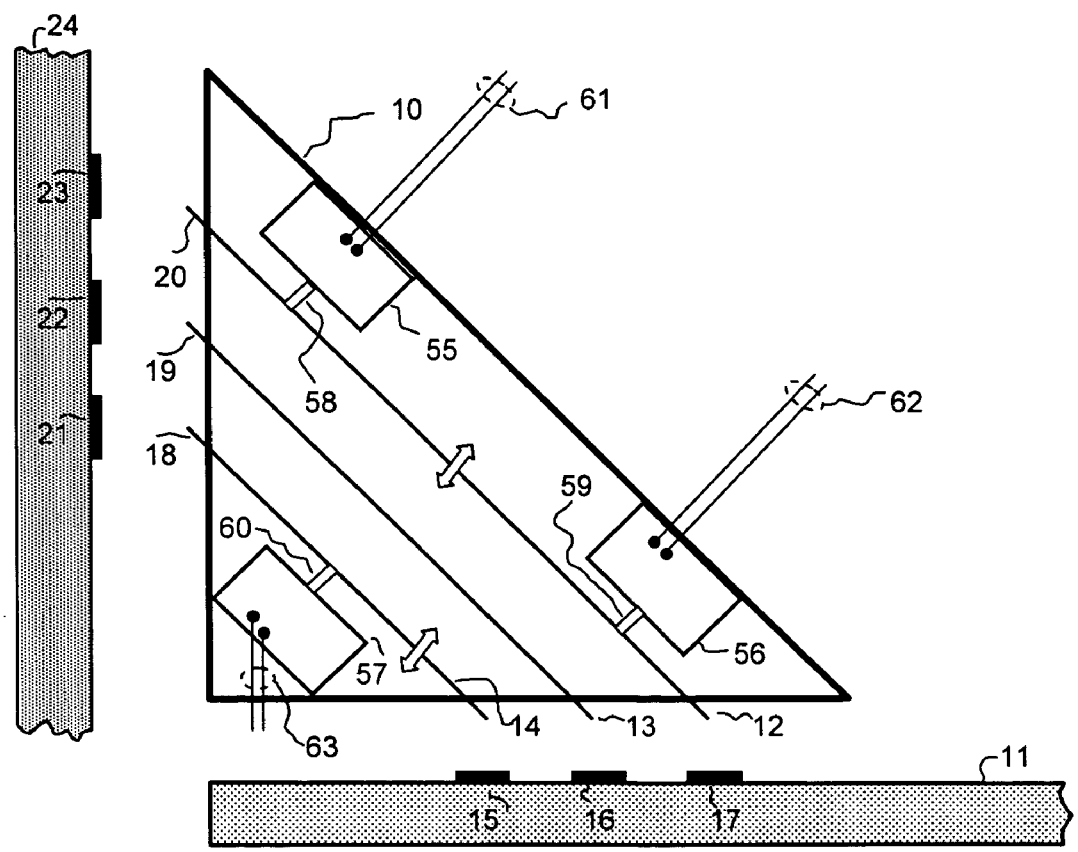
FIG. 6 illustrates an embodiment of the invention showing a cross-section side view of a right-angle connector utilizing actuators for signal path positioning.

FIG. 6 illustrates an embodiment of the invention. The addition of actuators 55, 56, 57 to the connector 10 provides for adjustment of the position of the ground planes 20-12, 18-14 relative to the differential signal pair 19-13. The actuators are connected to the ground planes through a mechanical coupling mechanism 58, 59, 60. In the embodiment, the position of the mechanical coupling mechanism 58,59,60 is controlled through electrical circuits 61, 62, 63. The ground planes 20-12, 18-14, are thus able to be positioned closer/further away from the differential pair 19-13. This movement adjusts the impedance of the differential signal pair. The invention allows for the actuators 55, 56, 57 to act independently or in unison. Therefore a gradient of positioning may be achieved providing a gradient in the impedance of the differential pair. It is this aspect of the invention which provides for linear impedance matching between two ends of an assembly.

Figure 7:
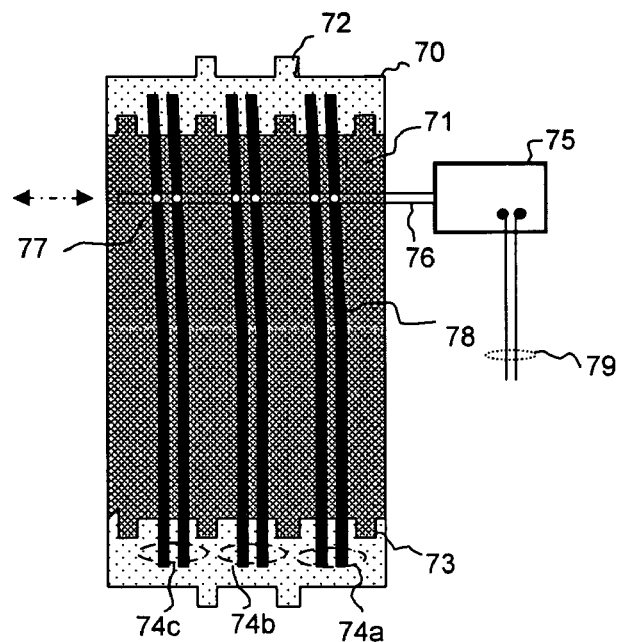
FIG. 7 illustrates an embodiment of the invention showing a top view of a right-angle connector with actuators for signal path positioning in a different direction.

FIG. 7 illustrates another embodiment of the invention where a signal conductor positioning actuator 75 has been added to a connector. The actuator 75 provides for alignment adjustment of the signal path conductors relative to the signal paths on the mating surfaces. With high-density connectors, due to tolerance build-ups, it is desirable to be able to adjust connector conductors so that they are centered upon their mating signal paths on the mating PCB. Differential pairs 74a, 74b, 74c are sandwiched between ground planes 70 and 71. A non-conductive actuator arm 76 is attached 77 onto differential signal pairs 74a, 74b, 74c so that actuator movement translates into the differential signal pairs being adjusted from side-to-side. The signal paths may be made to pivot through the entire signal path construction or alternatively through a hinge point 78 in the path of the signal pairs. The actuator in this embodiment is controlled by electrical voltage through control wires 79. While this embodiment illustrates the method for an actuator to control multiple signal path conductors, the invention does not restrict the number or position of signal path conductors. Signal path conductor without actuator control may be interspersed or interleaved with signal path conductors controlled by an actuator. Sets of signal path conductors may be controlled by one actuator with other sets under the control of a different actuator.

Although the embodiments of the invention illustrated in FIG. 6 and FIGS. 7 describe assemblies which provide for connections at right angles, the invention is not restricted to right angles and includes assemblies which provide for any angle of interconnection.

Figure 8:
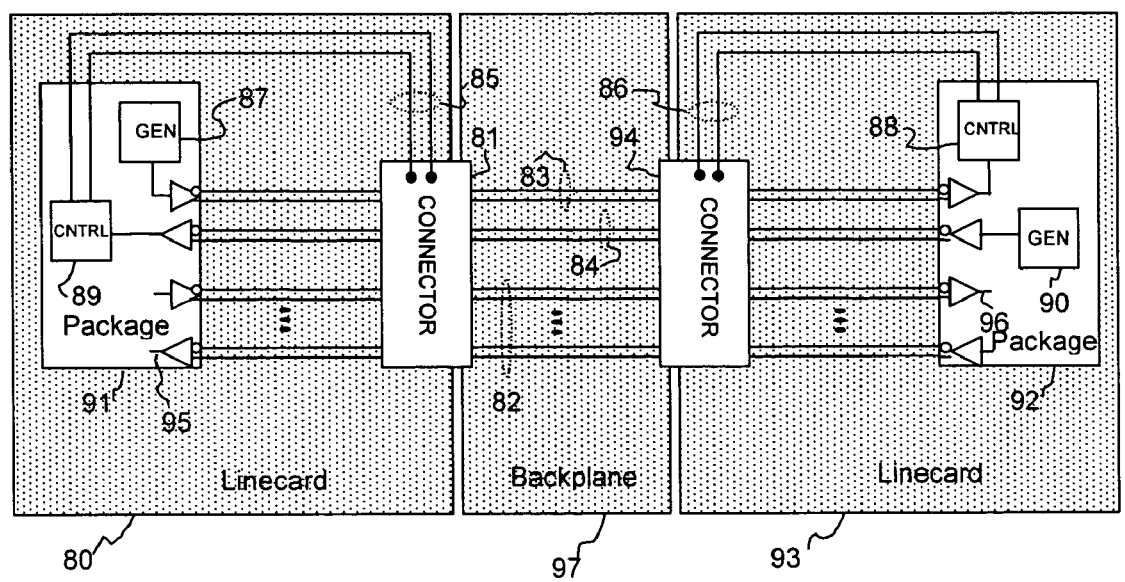
FIG. 8 illustrates an embodiment of the invention wherein the positioning of connector signal paths is controlled by the quality of the signals conducted through the connectors.

FIG. 8 illustrates an embodiment of the invention which includes connectors 81, 94 with actuator controlled signal path positioning and actuator controlled impedance as part of a chassis interconnect with a control system. The control system is comprised of data generators 87, 90 which provides reference signals 83, 84 for the adjustment of the active connectors 81, 94. The reference signals are accepted by controllers 88, 89. The controllers 88, 89 process the received reference signals 83, 84 and adjusts the positioning of the active elements of the connector 81, 94 through control lines 85, 86. The criteria used by the controller for adjusting the signal path positioning in connectors 81, 94 may include, but is not limited to, a signal peak detect (for optimizing signal strength), a timing window detect, and/or a full spectral analysis (as provided in a DSP implementation) to optimize the positioning of the actuators within each of the connectors. The controller may apply the adjustment criteria once, during a power on sequence, or may apply the adjustment criteria continually or at a periodic rate. The frequency of adjustment is not restricted. Adjustments may also be made on demand, such as when errors occur. Although not shown, the invention provides for multiple actuators within a single assembly for adjusting multiple parameters (such as alignment, impedance, etc. . . . ). An alternate embodiment of the invention eliminates the need for generators 87, 90 and instead the controllers 88, 89 make the connector element adjustments based upon normal system signals traveling through the connectors by inspecting signal levels and timing from normal data exchanges. The package 91 may be, but is not limited to, integrated circuit packages, Multi-chip modules (MCMs), MEMS (Micro Electromechanical Systems), MOEMS (Micro OptoEletrical Mechanical Systems) or discrete components.

Figure 9:
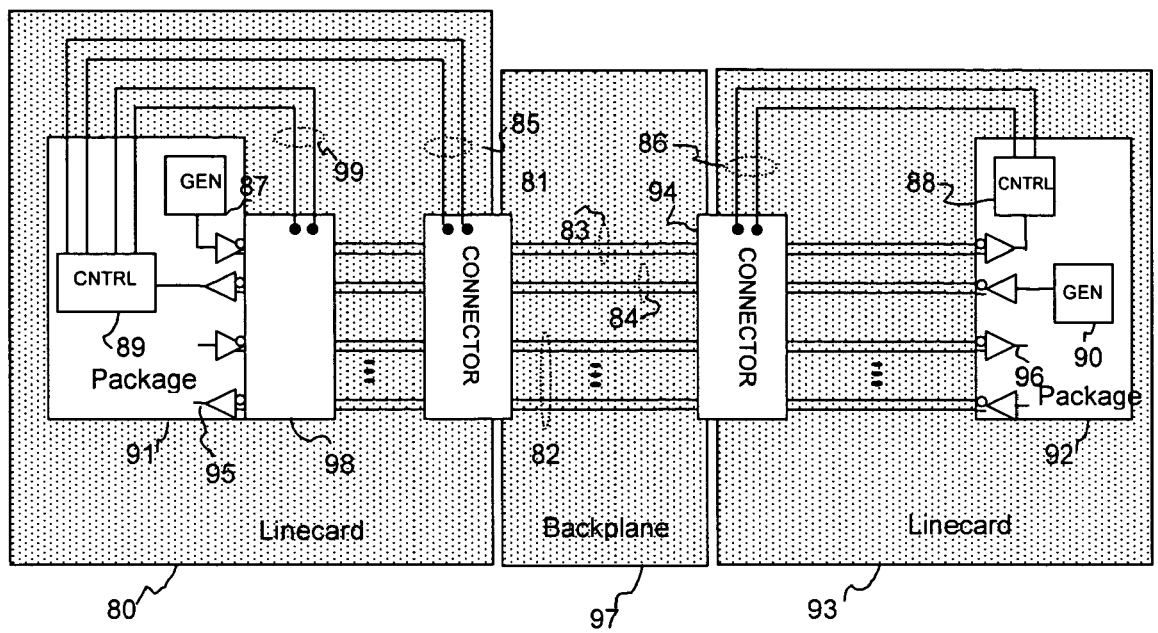
FIG. 9 illustrates an embodiment of the invention wherein the positioning of connector signal paths and packaging signal paths are controlled by the quality of the signals conducted through the connectors and packaging.

FIG. 9 illustrates an embodiment of the invention similar to FIG. 8 but includes the addition of a positioning assembly 98 as part of a package 91 which provides for the alignment of incoming signal lines into package 91. Similar to the line card connector 94, the alignment (or other positioning parameters) are adjustable in the assembly 98 through the generator 87 and controller 89 mechanism.

Figure 10:
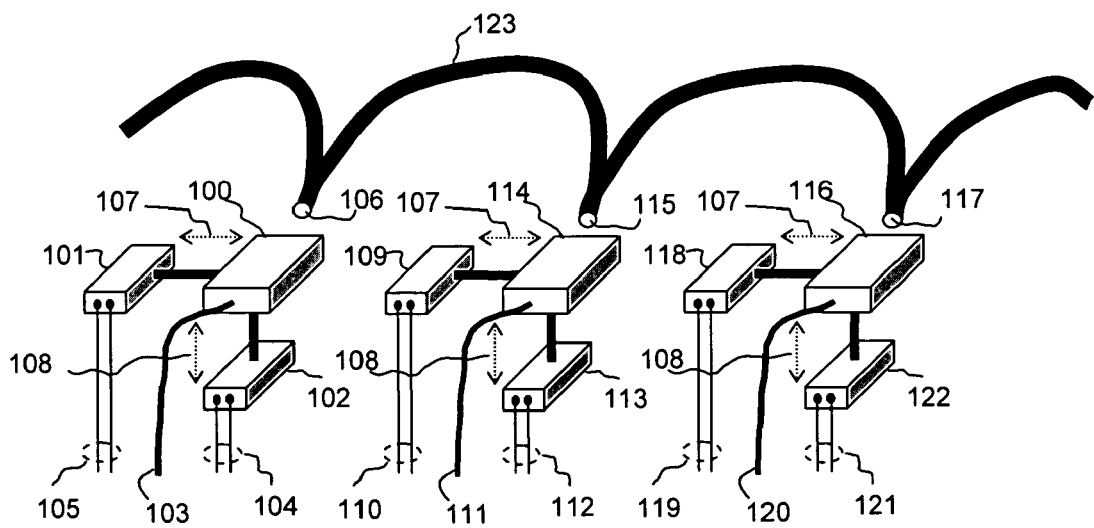
FIG. 10 illustrates an embodiment of the invention wherein the alignment of optical pathways are controlled by the quality of the optical signal conducted through the pathways.

FIG. 10 illustrates an embodiment of the invention wherein actuators are utilized to accurately adjust optical transceivers in relation to an optical channel 123. In the case of multiple wavelength fiber optics, optical signals of different wavelength may be injected into a single optical channel (e.g. fiber). Owing to the critical tolerances necessary to place optical transceivers within micron precision, sophisticated manufacturing techniques are often needed. Instead of relying upon a mechanical placement of optical transceivers during manufacture, the embodiment shown in FIG. 10 allows the rough placement of optical transceivers wherein the final adjustment is made by the system through the use of actuators. Optical transceiver 100 is attached to two actuators 101, 102 so that its alignment to the opening in a fiber 106 may be matched and optimized. The two alignment directions are shown with arrows 107, 108. Other axis of control (eg rotation, tilt, etc . . . ) are anticipated but not illustrated. The control signals 104, 105 are generated by a controller which is based upon the signal being received by the optical transceivers 100, 114, 116.

Although the invention has been described with reference to specific exemplary embodiments thereof, it will be evident that various modifications and changes may be made thereto without departing from the broader spirit and scope of the invention. The specification and drawings are, accordingly, to be regarded in an illustrative rather than a restrictive sense.

What is claimed is:

1. An interconnection assembly comprising:
   a first electrical signal conductor with at least two terminations;
   an electrically conductive member proximate the first electrical signal conductor: and
   a first actuator controlled by a control signal to adjust the position of the first electrical signal conductor relative to the electrically conductive member, wherein the interconnection assembly is configured such that the first electrical signal conductor remains electrically discontinuous from the electrically conductive member.

2. The interconnection assembly of claim 1 wherein the first actuator is configured to adjust the position of one of the at least two terminations independently of the other of the at least two terminations.

3. The interconnection assembly of claim 1 wherein the first actuator is configured to adjust the position of the first electrical signal conductor in a first direction and wherein the interconnection assembly further comprises a second actuator to adjust the position of the first electrical signal conductor in a second direction that is different from the first direction.

4. The interconnection assembly of claim 1 wherein the first actuator is integral to the assembly.

5. The interconnection assembly of claim 1 wherein the first actuator is external to the assembly.

6. The interconnection assembly of claim 1 further comprising an optical signal conductor.

7. The interconnection assembly of claim 1 wherein the electrically conductive member includes a second electrical signal conductor, wherein the first and second electrical signal conductors comprise a differential pair of electrical signal conductors.

8. The interconnection assembly of claim 1 wherein the electrically conductive member comprises a first ground plane.

9. The interconnection assembly of claim 1 wherein the first signal conductor is substantially parallel to the electrically conductive member, second signal conductor.

10. The interconnection assembly of claim 8 wherein the first actuator is configured to adjust the position of the first electrical signal conductor relative to the first ground plane.

11. The interconnection assembly of claim 8 further comprising a second ground plane, wherein the first electrical signal conductor is disposed between the first and second ground planes.

12. A control system comprising:
    an interconnection assembly including a first electrical signal conductor with first and second terminations, an actuator to adjust the position of the first electrical signal conductor in response to a control signal; and
    a controller having an input coupled to receive signal quality information from the interconnection assembly and an output coupled provide the control signal to the actuator.

13. The control system of claim 12 wherein the controller is configured to generate the control signal based, at least in part, on a signaling characteristic of a signal traveling through the first electrical signal conductor.

14. The control system of claim 13 wherein the signaling characteristic comprises a signal return loss.

15. The control system of claim 13 wherein the signaling characteristic comprises a frequency response.

16. The control system of claim 13 wherein the signaling characteristic comprises cross-talk interference.

17. The control system of claim 13 wherein the signaling characteristic comprises an amplitude of the signal traveling through the first electrical signal conductor.

18. The control system of claim 17 wherein the controller is configured to detect a peak amplitude of the signal traveling through the first electrical signal conductor and wherein the amplitude comprises the peak amplitude.

19. The control system of claim 13 wherein the signaling characteristic comprises a phase angle of the signal traveling through the first electrical signal conductor.

20. The control system of claim 12 wherein the controller comprises a semiconductor device.

21. The control system of claim 12 further comprising a second electrical signal conductor, wherein the first and second electrical signal conductors comprise a differential pair of electrical signal conductors.

22. The control system of claim 12 wherein the first electrical signal conductor is disposed proximate a first ground plane.

23. The control system of claim 21 wherein the actuator is configured to adjust the position of the first electrical signal conductor relative to the second electrical signal conductor.

24. The control system of claim 22 wherein the actuator is configured to adjust the position of the electrical signal conductor relative to the first ground plane.

25. The interconnection assembly of claim 24 further comprising a second ground plane, wherein the first electrical signal conductor is disposed between the first and second ground planes.

26. The control system of claim 12 wherein the actuator is configured to adjust the position of the first electrical signal conductor so as to alter an impedance of the first electrical signal conductor.

27. A method of controlling an interconnection apparatus, the method comprising:

measuring a signaling characteristic of a signal passing through a first electrical signal conductor of the interconnection apparatus; and outputting a first control signal to an actuator within the interconnection apparatus to move the first electrical signal conductor by a distance determined, at least in part, on the signaling characteristic.

28. The method of claim 27 further comprising, prior to outputting the first control signal, outputting a second control signal to the actuator to place the actuator in a known reference state.

29. The method of claim 27 further comprising generating the signal passing through the first electrical signal conductor in accordance with a predetermined data pattern.

30. The method of controlling an interconnection apparatus of claim 27 further comprising altering an impedance of the first electrical signal conductor.

31. A method of controlling an interconnection apparatus of claim 27 further comprising altering a distance between the first signal conductor and a ground plane.

32. The method of controlling an interconnection apparatus of claim 27 further comprising altering a distance between the first signal conductor and a second signal conductor.

33. The method of controlling an interconnection apparatus of claim 32 wherein altering a distance between a first signal conductor and a second signal conductor comprises altering a distance between a differential pair of signal conductors.

* * * * *